US012007090B2

(12) United States Patent
Mochimaru

(10) Patent No.: US 12,007,090 B2
(45) Date of Patent: Jun. 11, 2024

(54) LIGHT SOURCE UNIT, AND LIGHT EMITTING DEVICE FOR MOBILE BODY

(71) Applicant: Ichikoh Industries, Ltd., Isehara (JP)

(72) Inventor: Harumi Mochimaru, Isehara (JP)

(73) Assignee: Ichikoh Industries, Ltd., Isehara (JP)

( * ) Notice: Subject to any disclaimer, the term of this patent is extended or adjusted under 35 U.S.C. 154(b) by 0 days.

(21) Appl. No.: 18/160,805

(22) Filed: Jan. 27, 2023

(65) Prior Publication Data

US 2023/0175664 A1 Jun. 8, 2023

Related U.S. Application Data

(63) Continuation of application No. 17/602,347, filed as application No. PCT/JP2020/016207 on Apr. 10, 2020, now abandoned.

(30) Foreign Application Priority Data

Apr. 12, 2019 (JP) ................................ 2019-076253

(51) Int. Cl.
*F21S 43/16* (2018.01)
*F21S 43/31* (2018.01)

(52) U.S. Cl.
CPC ............... *F21S 43/16* (2018.01); *F21S 43/31* (2018.01)

(58) Field of Classification Search
CPC ....... F21S 43/14–16; F21S 43/239–255; F21S 43/30–40; F21S 45/10
See application file for complete search history.

(56) References Cited

U.S. PATENT DOCUMENTS

| | | | | |
|---|---|---|---|---|
| 5,931,566 A * | 8/1999 | Fraizer | F21V 3/04 362/540 |
| 6,908,220 B2 * | 6/2005 | Misawa | F21S 43/26 362/545 |
| 7,686,489 B2 | 3/2010 | Ajiki et al. | |
| 2007/0188102 A1 | 8/2007 | Lee et al. | |
| 2008/0013335 A1 | 1/2008 | Tsutsumi | |
| 2011/0216554 A1 | 9/2011 | Hattori et al. | |
| 2016/0003440 A1 | 1/2016 | Wataya et al. | |
| 2017/0198874 A1 | 7/2017 | Matsunami et al. | |

(Continued)

FOREIGN PATENT DOCUMENTS

| | | |
|---|---|---|
| EP | 3355664 A1 * | 8/2018 |
| JP | 2000-326785 A | 11/2000 |
| JP | 2007-220671 A | 8/2007 |

(Continued)

OTHER PUBLICATIONS

International Search Report dated Jun. 16, 2020 in PCT/JP2020/016207 filed on Apr. 10, 2020 (citing references 1-4 and 16-21 therein, 3 pages).

*Primary Examiner* — Jason M Han
(74) *Attorney, Agent, or Firm* — Oblon, McClelland, Maier & Neustadt, L.L.P.

(57) ABSTRACT

A light source unit includes: a light source part that emits excitation light; a light emitting part that emits generated light by being irradiated with the excitation light; a support part that guides the excitation light to the light emitting part while supporting the light emitting part; and a reflective part provided on a back surface of the support part, the back surface being on a side opposite to an emission direction of the generated light.

36 Claims, 7 Drawing Sheets

(56) References Cited

U.S. PATENT DOCUMENTS

2018/0045881 A1 2/2018 Gotou et al.

FOREIGN PATENT DOCUMENTS

| | | | |
|---|---|---|---|
| JP | 2007220671 | A | 8/2007 |
| JP | 2008-21578 | A | 1/2008 |
| JP | 2008021578 | A | 1/2008 |
| JP | 2008-123969 | A | 5/2008 |
| JP | 2008123969 | A | 5/2008 |
| JP | 2008163809 | A | 7/2008 |
| JP | 2009206064 | A | 9/2009 |
| JP | 2011-187285 | A | 9/2011 |
| JP | 2011187285 | A | 9/2011 |
| JP | 2015050148 | A | 3/2015 |
| JP | 2017-92010 | A | 5/2017 |
| JP | 2018-67491 | A | 4/2018 |
| JP | 2018067491 | A | 4/2018 |
| WO | 2013/114747 | A1 | 8/2013 |
| WO | 2016/148005 | A1 | 9/2016 |
| WO | WO 2016/148005 | A1 | 9/2016 |

* cited by examiner

LIGHT SOURCE UNIT, AND LIGHT EMITTING DEVICE FOR MOBILE BODY

CROSS REFERENCE TO RELATED APPLICATIONS

This application is a continuation of U.S. application Ser. No. 17/602,347, filed Oct. 8, 2021, 2020, which is based upon and claims a priority benefit from U.S. National Stage Patent Application No. PCT/JP2020/016207, entitled "LIGHT SOURCE UNIT, AND LIGHT EMITTING DEVICE FOR MOBILE BODY", filed on Apr. 10, 2020, the entire contents of which are herein incorporated by reference.

TECHNICAL FIELD

The present disclosure relates to a light source unit and a light emitting device for a mobile body.

BACKGROUND ART

A light source unit is used, for example, as a vehicular lamp having a signal light function such as a tail lamp, and is considered to perform surface emission (see, for example, PTL 1). This light source unit includes a light source, a plate-shaped light guide lens that guides light therefrom, and a lens member that emits the guided light. In this light source unit, the light guide lens internally guides the light diffused from the light source and emits the guided light from a light emitting surface, so that the light emits through the lens member in a substantially uniform manner.

CITATION LIST

Patent Literature

PTL 1: Japanese Unexamined Patent Application Publication No. 2017-092010

SUMMARY OF THE INVENTION

Problems to be Solved by the Invention

However, the above conventional light source unit emits light in the substantially uniform manner, and there is room for improvement from the viewpoint of uniform light emission, that is, appropriate surface emission.

The present disclosure has been made in view of the above circumstances, and an object of the present disclosure is to provide a light source unit capable of appropriately performing surface emission.

Means for Solving the Problem

According to an aspect of the present disclosure, there is provided a light source unit including: a light source part that emits excitation light; a light emitting part that emits generated light by being irradiated with the excitation light; a support part that guides the excitation light to the light emitting part while supporting the light emitting part; and a reflective part provided on a back surface of the support part, the back surface being on a side opposite to an emission direction of the generated light.

Effect of the Invention

According to the present disclosure, it is possible to appropriately perform surface emission.

MODE FOR CARRYING OUT THE INVENTION

Figure 1:
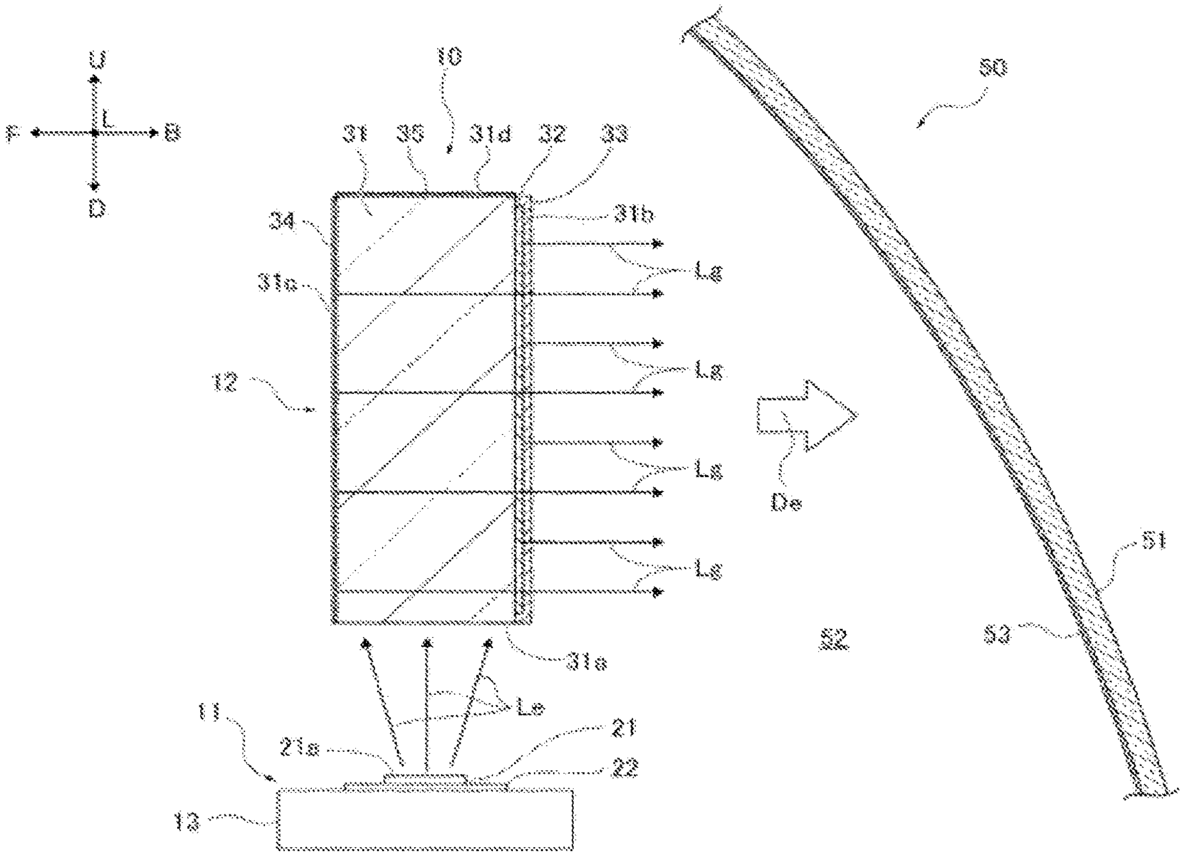
FIG. 1 is an explanatory diagram illustrating a state in which a light source unit is provided in a vehicular lamp as an example of a light emitting device for a mobile body including the light source unit of a first embodiment of a light source unit according to this embodiment.

Hereinafter, each embodiment in which a light source unit according to this embodiment is applied to a vehicular lamp as an example of a light emitting device for a mobile body will be described with reference to the drawings. In FIG. 1, a state in which generated light Lg emits in the emission direction De is illustrated schematically, which does not necessarily coincide with an actual state.

First Embodiment

A light source unit 10 of a first embodiment according to an embodiment of the light source unit of this embodiment will be described with reference to FIG. 1 and FIG. 2. As illustrated in FIG. 1, the light source unit 10 of the first embodiment is used as a vehicular lamp 50 of a vehicle such as an automobile as an example of a mobile body, and is suitable for a signal lamp, a position lamp or a signature lamp, and an example in which the light source unit is used for a rear combination lamp is illustrated in the first embodiment. In the following description, in the vehicular lamp 50, the direction of travel of a vehicle mounted with the vehicular lamp 50 upon advancement is defined as the front-rear direction (the front side of the vehicle is denoted by F and the rear side of the vehicle is denoted by B), the vertical direction is defined as the up-down direction (the upper side is denoted by U and the lower side is denoted by D), and the direction orthogonal to the front-rear direction and the up-down direction is defined as the left-right direction (the right side of a driver is denoted by R and the left side of the driver is denoted by L).

The vehicular lamp 50 is disposed on each of both right and left sides of the rear of the vehicle and is configured to have the light source unit 10 installed in a lamp chamber 52 formed by covering a lamp housing, which is open on one side, with an outer lens from the open side. The lamp housing has a hollow shape having an open first end and a closed second end, constitutes a mounting place for the light source unit 10 and houses a lighting drive device for lighting control of the light source unit 10 (light source 21 thereof). While enabling the emission of light (generated light Lg described below) from the light source unit 10 housed in the lamp housing (light chamber 52), the outer lens 51 covers the emitted light. The outer lens 51 is provided with a filter part 53 having a function of UV (ultraviolet) cutting for blocking the transmission of ultraviolet rays, namely, blocking (suppressing) the transmission of light in an ultraviolet wavelength band. The filter part 53 is formed by a coating having a function of UV cutting provided on a surface of the outer lens 51 in the first embodiment, and is transparent. Therefore, the light source unit 10 emits light (generated light Lg) toward the side on which the outer lens 51 is provided, and the direction toward the outer lens 51 is defined as the emission direction De.

Figure 2:
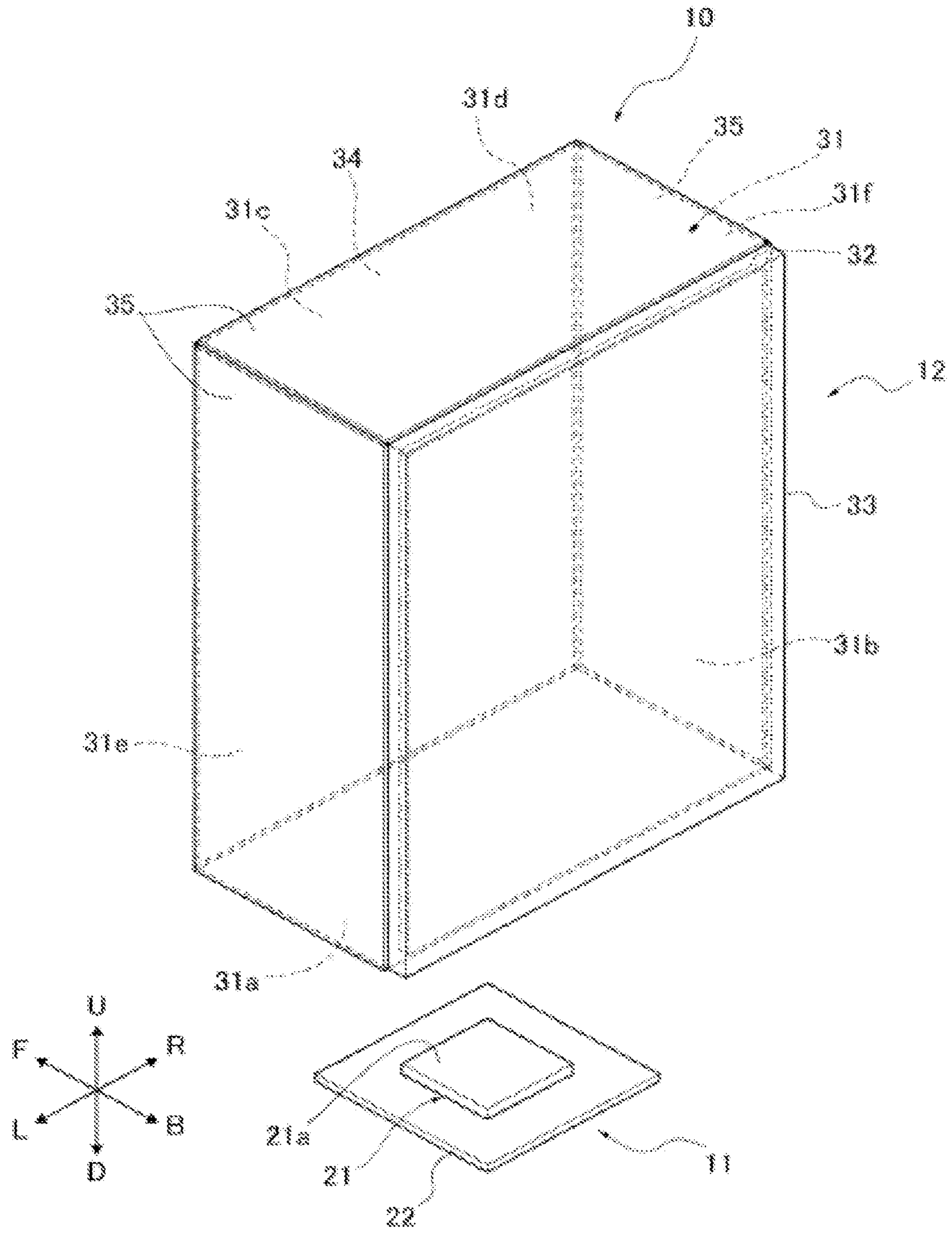
FIG. 2 is an explanatory diagram schematically illustrating the light source unit of the first embodiment.

The light source unit 10 has a light source part 11, a light generating part 12, and a heat radiating member 13, as illustrated in FIG. 1 and FIG. 2. The heat radiating member 13 is a heat sink that radiates heat from the light source part 11 (light source 21 thereof) to the outside. The heat radiating member 13 is formed of a material having excellent thermal conductivity (a material having low thermal resistance) such as metal and resin, and may have comb-teeth shaped heat radiating fins for securing a heat radiating area. The heat radiating member 13 is mounted with the light source part 11 and provided in the lamp chamber 52.

The light source part 11 emits excitation light Le for emitting (exciting) the generated light Lg from the light generating part 12 (light emitting layer 32 thereof (light emitting part)), and has the light source 21 and a support substrate 22. The light source 21 is composed of, for example, a semiconductor type light source such as an LED (light emitting diode), an OEL (organic electro-luminescence) and an OLED (organic EL) (organic light-emitting diode). The light source 21 is disposed below the light generating part 12, and a light emitting surface 21*a* is directed upward, namely, toward the light generating part 12, and emits light upward from the light emitting surface 21*a* so as to form a Lambertian distribution. The light source 21 emits blue light from the light emitting surface 21*a* as an example of the excitation light Le. The light source 21 is not limited to one that emits blue light, but can be one that emits light of a wavelength (such as violet light or ultraviolet light in the first embodiment) shorter than the wavelength of the generated light Lg generated in the light emitting layer 32 (light generating part 12).

The support substrate 22 is mounted with the light source 21 thereon, and is provided with a wiring pattern for energizing the light source 21. The support substrate 22 is provided on the heat radiating member 13 via a bracket or the like. The support substrate 22 enables power supply to the light source 21 from a lighting control circuit via the wiring pattern, and enables the light source 21 to be turned on and off as appropriate.

The light generating part 12 has a support member 31 (support part), the light emitting layer 32, a sealing part 33, a first reflective part 34, and second reflective parts 35. The support member 31 is provided in the lamp chamber 52 independently of the light source part 11 by a bracket or the like. The support member 31 is formed of a material capable of transmitting the excitation light Le emitted from the light source 21, and has a rectangular parallelepiped shape in the first embodiment. The support member 31 may be a rigid member formed of, for example, glass or the like, or a flexible member formed of acrylic resin, a thermoplastic material, or the like, but in the first embodiment, the rigid member is used. The support member 31 is also capable of transmitting the generated light Lg emitted by the light emitting layer 32. In the support member 31, a surface facing the light source 21 of the light source part 11 is an incident surface 31*a*. The incident surface 31*a* is a surface on which the excitation light Le from the light source 21 of the light source part 11 is incident into the inside of the support member 31, and the size and the positional relationship of the incident surface 31*a* to the light emitting surface 21*a* of the light source 21 are set so as to allow the excitation light Le to be efficiently incident. The excitation light Le is guided inside the support member 31 to enable irradiation over the entire surface of the light emitting layer 32.

In the support member 31, a surface on the emission direction De side of the generated light Lg (the front side in the emission direction De), namely, the surface facing the outer lens 51 is defined as a front surface 31*b*, and a surface located on the side opposite to the front surface 31*b* (the rear side in the emission direction De) is defined as a back surface 31*c*. In the support member 31, among four side surfaces connecting the front surface 31*b* and the rear surface 31*c*, the surface located on the side opposite to the lower incident surface 31*a* is defined as an upper surface 31*d*, the side surface on the near side (left side in the left-right direction) in front view of FIG. 1 and FIG. 2 is defined as a first side surface 31*e*, and the surface located on the back side (right side in the left-right direction) in front view of FIG. 1 and FIG. 2 is define as a second side surface 31*f*.

The light emitting layer 32 is excited by being irradiated with the excitation light Le from the light source 21 and emits the generated light Lg.

The light emitting layer 32 is provided on the front surface 31*b* of the support member 31 so as to expand in a planar shape (in a wide area along the front surface 31*b*), and in the first embodiment, the light emitting layer 32 is formed in a thin film form by subjecting deposition treatment to the front surface 31*b*. This light emitting layer 32 emits the generated light Lg toward the emission direction De by being irradiated with the excitation light Le, and also emits the generated light Lg toward the side opposite to the emission direction De. The light emitting layer 32 is transparent in a state in which there is no irradiation with the excitation light Le. As such a light emitting layer 32, for example, an organic material doped with about 5% of a red phosphorescent material ((btp)2Ir(acac)) such as acetylacetone as a dopant material to a host material such as polyvinylcarbazole is used. In this case, the light emitting layer 32 emits red light as the generated light Lg by irradiation with the excitation light Le. Therefore, the light emitting layer 32 functions as a light emitting part that emits the generated light Lg by being irradiated with the excitation light Le, and the support member 31 functions as a support part that supports the light emitting layer 32 as a light emitting part.

The host material and the dopant material in the light emitting layer 32 are not limited to the above materials and can be selected as appropriate. For example, the dopant material can emit the generated light Lg of blue light by using a blue phosphorescent material (FIrpic), can emit the generated light Lg of yellow light by using a yellow phosphorescent material ((bzp)2Ir(acac)), and can emit the generated light Lg of green light by using a green phosphorescent material ((ppy)2Ir(acac)). For the host material in the light emitting layer 32, an inorganic material such as YAG (Yttrium Aluminum Garnet) can be used.

The sealing part 33 is provided in order to seal the light emitting layer 32 and is formed of a material that transmits the excitation light Le and the generated light Lg. The sealing part 33 may be, for example, a rigid member formed of, for example, glass or epoxy resin, as well as the support member 31, or may be a flexible member formed of acrylic resin, thermoplastic material, or the like, and is the same member as the support member 31 in the first embodiment. The sealing part 33 is provided on the front surface 31*b* of the support member 31 so as to cover the entire light emitting layer 32, that is, so as to be in contact with the front surface 31*b* around the top, bottom, left and right of the light emitting layer 32 in the direction along the front surface 31*b* of the support member 31, and is provided so as to cover the entire surface of the light emitting layer 32. Consequently, the sealing part 33 cooperates with the support member 31 to prevent the light emitting layer 32 from being exposed to air. This is due to the fact that the light emitting layer 32 deteriorates when the light emitting layer 32 is exposed to air.

The first reflective part 34 and the second reflective parts 35 prevent the excitation light Le emitted from the light source part 11 (light source 21) and incident into the support member 31 and the generated light Lg emitted from the light emitting layer 32 and incident into the support member 31 from emitting to the outside of the support member 31. The first reflective part 34 and the second reflective parts 35 are formed by bonding aluminum, silver, or the like to the support member 31 (surfaces thereof) by vapor deposition, painting, or the like. The first reflective part 34 is provided over the entire surface of the back surface 31*c* of the support member 31, and reflects the excitation light Le and the generated light Lg that travel to the back surface 31*c*. The second reflective parts 35 are provided over the entire surfaces of the upper surface 31*d*, the first side surface 31*e* and the second side surface 31*f* of the support member 31, that is, over the entire surfaces of the side surfaces that are laid between the front surface 31*b* and the back surface 31*c* at positions different from the incident surface 31*a*, and reflects the excitation light Le and the generated light Lg that travel to each surface thereof.

Now, the operation (lighting) of the vehicular lamp 50 configured as described above will be described. In the vehicular lamp 50, electric power is supplied from the lighting control circuit, and the light source 21 of the light source part 11 is turned on, so that the excitation light Le emitted from the light emitting surface 21*a* of the light source 21 goes to the light generating part 12 on the upper side. The excitation light Le is incident into the support member 31 from the incident surface 31*a*, and a portion of the excitation light Le goes to the front surface 31*b* and the other portion of the excitation light goes to the back surface 31*c*, the upper surface 31*d*, the first side surface 31*e*, and the second side surface 31*f*. The other portion of the excitation light Le is reflected by the first reflective part 34 on the back surface 31*c* or the second reflective parts 35 on the upper surface 31*d*, the first side surface 31*e* and the second side surface 31*f*, and goes to the front surface 31*b* directly or by repeated reflection. Consequently, the support member 31 guides the incident excitation light Le internally, so that the entire front surface 31*b* (light emitting layer 32 thereof) can be irradiated with the excitation light Le.

The light emitting layer 32 provided on the front surface 31*b* is irradiated with the excitation light Le directed to the front surface 31*b*. The light emitting layer 32 is excited by the irradiation with the excitation light Le and emits the generated light Lg which is red light. A portion of the generated light Lg travels in the emission direction De, and the other portion of the generated light Lg travels into the support member 31. The generated light Lg that travels into the support member 31 is reflected by the first reflective part 34 or the second reflective parts 35, so that the generated light Lg goes toward the front surface 31*b* directly or by repeated reflection, passes through the light emitting layer 32, and travels in the emission direction De. The generated light Lg which travels in the emission directions De can travel to the outer lens 51 as light emitted from the light source unit 10, travels to the outside of the lamp chamber 52 through the outer lens 51, and is emitted from the vehicular lamp 50. This generated light Lg as red light is emitted from the outer lens 51 in the front direction and can be made to function as a rear combination lamp.

In addition, the vehicular lamp 50 is provided with the filter part 53 having a function of UV cutting on the outer lens 51. Therefore, the vehicular lamp 50 can prevent, for example, ultraviolet rays included in external light from penetrating the outer lens 51 and traveling to the light emitting layer 32 of the light generating part 12 of the light source unit 10, and can prevent the light emitting layer 32 from being degraded by the ultraviolet rays.

Now, the action of this light source unit 10 will be described. For the purpose of this explanation, an organic light emitting diode, which is considered as a configuration to realize surface emission in a light source, is used as a comparative example. This organic light emitting diode has a structure in which an electrode, an organic layer, and an electrode are stacked on a substrate, and realizes surface emission by flow of a current between the electrodes and emission of electroluminescence.

In the light source unit 10 of the first embodiment, the light emitting layer 32 is provided on the front surface 31*b* of the support member 31 by using an organic material in a state of expanding in the planar shape, and therefore the generated light Lg can be emitted evenly over the entire light emitting layer 32 expanded in the planar shape, and can cause surface emission in an area where the light emitting layer 32 is provided. Therefore, the light source unit 10 of the first embodiment can realize surface emission while ensuring the reliability of the light source, compared to an organic light emitting diode. Consequently, the light source unit 10 can easily obtain red light emitted in a plane shape while ensuring reliability as the vehicular lamp 50. In particular, the light source unit 10 is provided with the light emitting layer 32 on the front surface 31*b* located in the emission direction De (the front side thereof) in the support member 31, and therefore it is possible to efficiently emit the generated light Lg which is red light generated in the light emitting layer 32, and it is possible to obtain brighter surface emission.

In addition, the light source unit 10 of the first embodiment has a configuration in which the light emitting layer 32 provided in the support member 31 of the light generating part 12 emits red light as the generated light Lg by the irradiation with the excitation light Le from the light source part 11 (light source 21), and therefore no electrical degradation such as electrical degradation of an organic light emitting diode occurs. This is due to the fact that the organic light emitting diode undergoes electrical degradation when a current flows between electrodes to emit electroluminescence. Therefore, the light source unit 10 of the first embodiment can improve the reliability of the light source as compared with the organic light emitting diode.

The light source unit 10 is provided with the first reflective part 34 on the back surface 31*c* located on the side opposite to the emission direction De in the support member 31 of the light generating part 12. Therefore, the light source unit 10 can prevent the excitation light Le from the light source part 11 (light source 21) and the generated light Lg emitted by the light emitting layer 32 from emitting from the back surface 31*c* to the outside of the support member 31, and can reflect the excitation light Le and the generated light Lg, which go toward the back surface 31*c*, toward the front surface 31*b*. Consequently, the light source unit 10 can efficiently use the excitation light Le from the light source part 11 to emit the generated light Lg in the emission direction De (the front side thereof), and can perform surface emission more brightly. In particular, the light source unit 10 has the support member 31 that allows transmission of the generated light Lg, and is provided with the first reflective part 34 on the back surface 31*c*, and therefore the generated light Lg that is directed to the back surface 31*c* can also be reflected by the first reflective part 34 to be emitted in the emission direction De (the front side thereof), so that the generated light Lg emitted by the light emitting layer 32 can be efficiently used.

In addition to the first reflective part 34 on the back surface 31*c*, the light source unit 10 is provided with the second reflective parts 35 on the side surfaces (the upper surface 31*d*, the first side surface 31*e*, and the second side surface 310 different from the incident surface 31*a* in the support member 31. Therefore, the light source unit 10 can prevent the excitation light Le and the generated light Lg from emitting from the side surfaces of the support member 31 other than the incident surface 31*a* of the support member 31 to the outside of the support member 31. Consequently, the light source unit 10 can more efficiently use the excitation light Le to emit the generated light Lg from the light emitting layer 32 in the emission direction De (the front side thereof), so that it is possible to perform surface emission more brightly.

The light source unit 10 of the first embodiment can obtain each of the following effects.

The light source unit 10 includes the light source part 11, the light emitting layer 32 as a light emitting part that emits the generated light Lg by be irradiated with the excitation light Le from the light source part, the support member 31 as a support part that guides the excitation light Le to the light emitting layer 32 while supporting the light emitting layer 32, and the first reflective part 34 as a reflective part provided on the back surface 31*c* of the support member. Therefore, the light source unit 10 can reflect the excitation light Le and the generated light Lg, which go to the back surface 31*c*, toward the front surface 31*b* while preventing the excitation light Le and the generated light Lg from emitting from the back surface 31*c* to the outside of the support member 31, can efficiently use the excitation light Le from the light source part 11 to emit the generated light Lg in the emission direction De, and can perform surface emission more brightly. In addition, the light source unit 10 is provided with the light source part 11 and the light generating part 12 independently from each other, and therefore the degree of freedom of the installation position of each of the light source part 11 and the light generating part 12 can be increased, and the surface-emitting light emitting layer 32 can be visually recognized while preventing the light source part 11 from being visually recognized from outside. That is, in the light source unit 10, the light source part 11 can be provided at such a position as not to be visually recognized or can be shielded by a shielding member, and the light emitting layer 32 can be provided at such a position as to be visually recognized.

The light source unit 10 is provided with the second reflective parts 35 on the side surfaces (the upper surface 31*d*, the first side surface 31*e*, and the second side surface 31*f*) laid between the front surface 31*b* on the emission direction De side and the back surface 31*c* at the position different from the incident surface 31*a* in the support member 31. Therefore, the light source unit 10 can prevent the excitation light Le and the generated light Lg from emitting from the above side surfaces of the support member 31 to the outside of the support member 31, and can more efficiently use the excitation light Le to emit the generated light Lg in the emission direction De from the light emitting layer 32, so that it is possible to perform surface emission more brightly.

The vehicular lamp 50 as a light emitting device for a mobile body includes the light source unit 10, the outer lens 51 that emits the generated light Lg from the light source unit, and the filter part 53 that suppresses transmission of ultraviolet rays and is provided in the outer lens 51. Therefore, the vehicular lamp 50 can efficiently use the excitation light Le to emit the generated light Lg in the emission direction De from the light emitting layer 32, so that it is possible to perform surface emission more brightly and prevent the light emitting layer 32 from being degraded by ultraviolet rays. Consequently, the vehicular lamp 50 can realize surface emission while ensuring reliability.

Accordingly, the light source unit 10 of the first embodiment as a light source unit according to the present disclosure can appropriately perform surface emission.

In the first embodiment, the support member 31 as the support part is composed of a rigid member. However, the support part (support member 31) may be composed of a flexible member or any other configuration, and is not limited to the configuration of the first embodiment. When the support member 31 is composed of a flexible member, the sealing part 33 can also be composed of a flexible member, so that the light emitting layer 32, which is a light emitting surface in the light generating part 12, can be curved together with the support member 31. Therefore, the light source unit 10 can have a greater degree of freedom in the shape thereof while enabling surface emission, and can improve usability.

In the first embodiment, the back surface 31*c* is the flat surface. However, the back surface 31*c* may be, for example, a curved surface or any other configuration, as long as the back surface 31*c* is a surface located on the opposite side to the emission direction De of the generated light Lg in the support part (support member 31), and is not limited to the configuration of the first embodiment.

Second Embodiment

Figure 3:
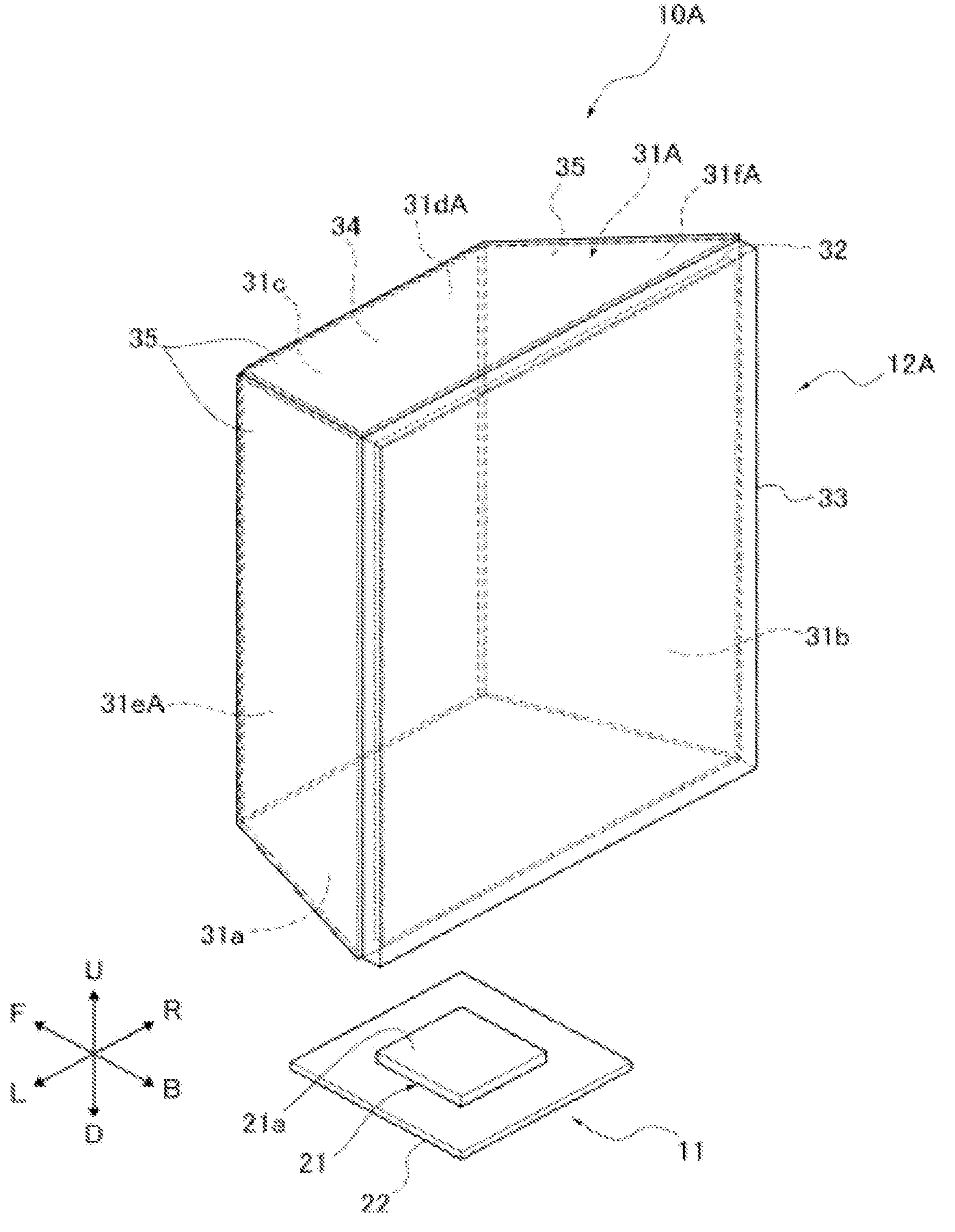
FIG. 3 is an explanatory diagram schematically illustrating a light source unit of a second embodiment in a similar manner to FIG. 2.

Now, a light source unit 10A of a second embodiment which is an embodiment of the present disclosure will be described with reference to FIG. 3. The light source unit 10A is one obtained by modifying the configuration of the support member 31 in the light generating part 12 of the light source unit 10 of the first embodiment. A basic concept and a configuration of the light source unit 10A are the same as those of the light source unit 10 of the first embodiment, and therefore the same reference numerals are affixed to parts having the same configurations, and detailed description will be omitted.

First, according to the light source unit 10A of the second embodiment, in a support member 31A of a light generating part 12A, an upper surface 31*d*A, a first side surface 31*e*A, and a second side surface 31*f*A are inclined in a state of being directed toward a front surface 31*b*. That is, the upper surface 31*d*A is inclined so as to be displaced upward from a back surface 31*c* toward the front surface 31*b*. The first side surface 31*e*A is inclined so as to be displaced to the left side in the left-right direction (near side of the figure in front view) from the back surface 31*c* toward the front surface 31*b*. The second side surface 31*f*A is inclined so as to be displaced to the right side in the left-right direction (back side of the figure in front view) from the back surface 31*c* toward the front surface 31*b*.

In this light source unit 10A, the upper surface 31*d*A, the first side surface 31*e*A, and the second side surface 31*f*A of the support member 31A are inclined in a state of being directed toward the front surface 31*b*, and therefore the light source unit 10A can more actively reflect excitation light Le and generated light Lg in the support member 31A, especially excitation light Le incident from the incident surface 31*a* toward the front surface 31*b*. Consequently, the light source unit 10A can perform surface emission more effectively and brightly while ensuring reliability.

The light source unit 10A of the second embodiment has basically the same configuration as the light source unit 10 of the first embodiment, and therefore the same effects as in the first embodiment can be obtained.

In addition to the above, in the light source unit 10A, the upper surface 31*d*A, the first side surface 31*e*A, and the second side surface 31*f*A of the support member 31A are inclined in a state of being directed toward the front surface 31*b*. Therefore, the light source unit 10A can more actively reflect the excitation light Le and the generated light Lg in the support member 31A toward the front surface 31*b*, and can perform surface emission more effectively and brightly while ensuring reliability.

Accordingly, the light source unit 10A of the second embodiment as a light source unit according to the present disclosure can appropriately perform surface emission.

In the second embodiment, the upper surface 31*d*A, the first side surface 31*e*A, and the second side surface 31*f*A, namely, entire side surfaces laid between the front surface 31*b* and the back surface 31*c* at positions different from the incident surface 31*a* are inclined in the state of being directed toward the front surface 31*b*. However, it is sufficient to incline at least one part (at least one side surface) of the above side surfaces in a state of being directed toward the front surface 31*b*, and is not limited to the configuration of the second embodiment.

Third Embodiment

Figure 4:
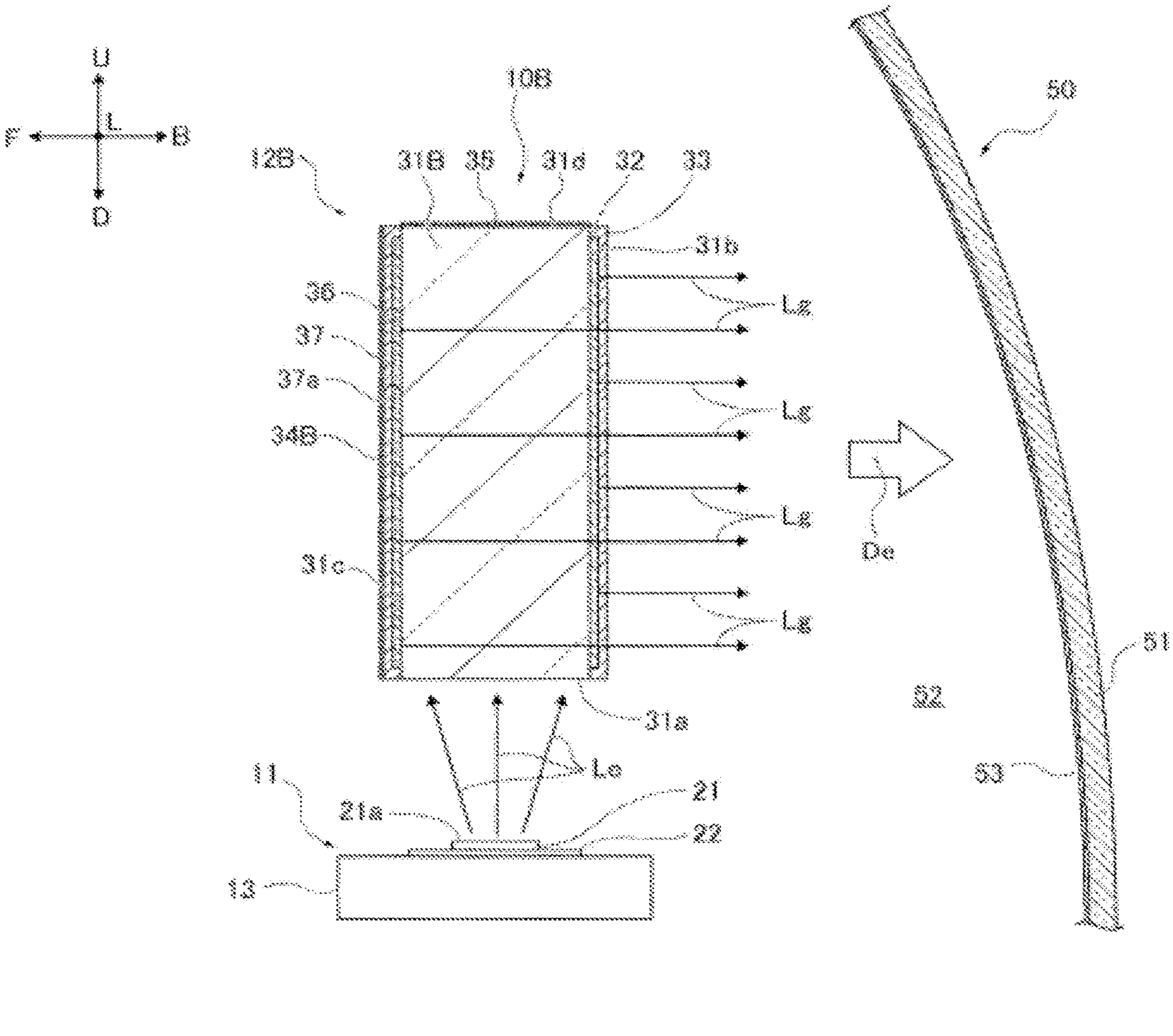
FIG. 4 is an explanatory diagram schematically illustrating a light source unit of a third embodiment in a similar manner to FIG. 1.

Now, a light source unit 10B of a third embodiment which is an embodiment of the present disclosure will be described with reference to FIG. 4. The light source unit 10B is one obtained by modifying the configuration of the support member 31 in the light generating part 12 of the light source unit 10 of the first embodiment. A basic concept and a configuration of the light source unit 10B are the same as those of the light source unit 10 of the first embodiment, and therefore the same reference numerals are affixed to parts having the same configurations, and detailed description will be omitted.

First, according to the light source unit 10B of the third embodiment, in a support member 31B of a light generating part 12B, a light emitting layer 32 provided on a front surface 31*b* is defined as a first light emitting layer 32 as a first light emitting part, and a sealing part 33 provided so as to cover the first light emitting layer 32 is defined as a first sealing part 33. The light source unit 10B is provided with a second light emitting layer 36 between a first reflective part 34B and a back surface 31*c* in the support member 31B of the light generating part 12B. This second light emitting layer 36 is the same as the first light emitting layer 32, and in the third embodiment, the second light emitting layer 36 is formed in the form of a thin film by subjecting deposition treatment to the back surface 31*c*. Herein, the second light emitting layer 36 is formed of a material of the same composition as the first light emitting layer 32, and emits generated light Lg of the same color (red light in the third embodiment).

The light source unit 10B is provided with a second sealing part 37 for sealing the second light emitting layer 36. This second sealing part 37 is the same as the first sealing part 33, and in the third embodiment, the second sealing part 37 is provided so as to cover the second light emitting layer 36.

The light source unit 10B is provided with the first reflective part 34B on an outer surface 37*a* (the front side in the front-rear direction and the side opposite to the emission direction De) in the second sealing part 37. This first reflective part 34B is formed by bonding aluminum, silver, or the like to the outer surface 37A by vapor deposition, painting, or the like.

This light source unit 10B is provided with the second light emitting layer 36 between the first reflective part 34B and the back surface 31*c*, and therefore the generated light Lg which is red light can be emitted also from the second light emitting layer 36 by using the excitation light Le which travels to the back surface 31*c* directly or by reflection by the second reflective parts 35. A portion of the generated light Lg from the second light emitting layer 36 goes toward the front surface 31*b* directly or by reflection by the second reflective parts 35, and passes through the first light emitting layer 32 to be emitted in the emission direction De (the front side thereof) from the light source unit 10B. The other portion of the generated light Lg from the second light emitting layer 36 travels to the side opposite to the emission direction De, passes through the second sealing part 37, is reflected by the first reflecting part 34B, passes through the second sealing part 37 again, and then goes toward the back surface 31*c* directly or by reflection by the second reflective parts 35, passes through the first light emitting layer 32, and is emitted in the emission direction De. Therefore, in addition to the generated light Lg emitted from the first light emitting layer 32, the generated light Lg emitted from the second light emitting layer 36 can pass through the first light emitting layer 32 and be emitted in the emission direction De, so that the light source unit 10B can obtain a large amount of light. Thus, the light source unit 10B can perform surface emission more effectively and brightly while the first light emitting layer 32 and the second light emitting layer 36 are more efficiently disposed.

The light source unit 10B of the third embodiment has basically the same configuration as the light source unit 10 of the first embodiment, and therefore the same effects as in the first embodiment can be obtained.

In addition to the above, in the light source unit 10B, the second light emitting layer 36 is provided between the first reflective part 34B and the back surface 31*c*. Therefore, in the light source unit 10B, in addition to the generated light Lg emitted from the first light emitting layer 32, the generated light Lg emitted from the second light emitting layer 36 can be emitted in the emission direction De, and therefore it is possible to perform surface emission more effectively and brightly while ensuring reliability.

Accordingly, the light source unit 10B of the third embodiment as a light source unit according to the present disclosure can appropriately perform surface emission.

In the third embodiment, the first light emitting layer 32 and the second light emitting layer 36 are made to emit generated light Lg of the same color (red light) (formed of the same material), but may be made to emit generated light Lg of different colors from each other, and are not limited to the configuration of the third embodiment. In this case, as described in the first embodiment, by appropriately selecting a host material and a dopant material, it is possible to emit the generated light Lg of different colors from each other. With this configuration, by considering the combination of colors of the first light emitting layer 32 and the second light emitting layer 36, it is possible to synthesize colors that cannot be formed by each of the first light emitting layer 32 and the second light emitting layer 36 alone, so that it is possible to increase the diversity of colors for surface emission.

Fourth Embodiment

Figure 5:
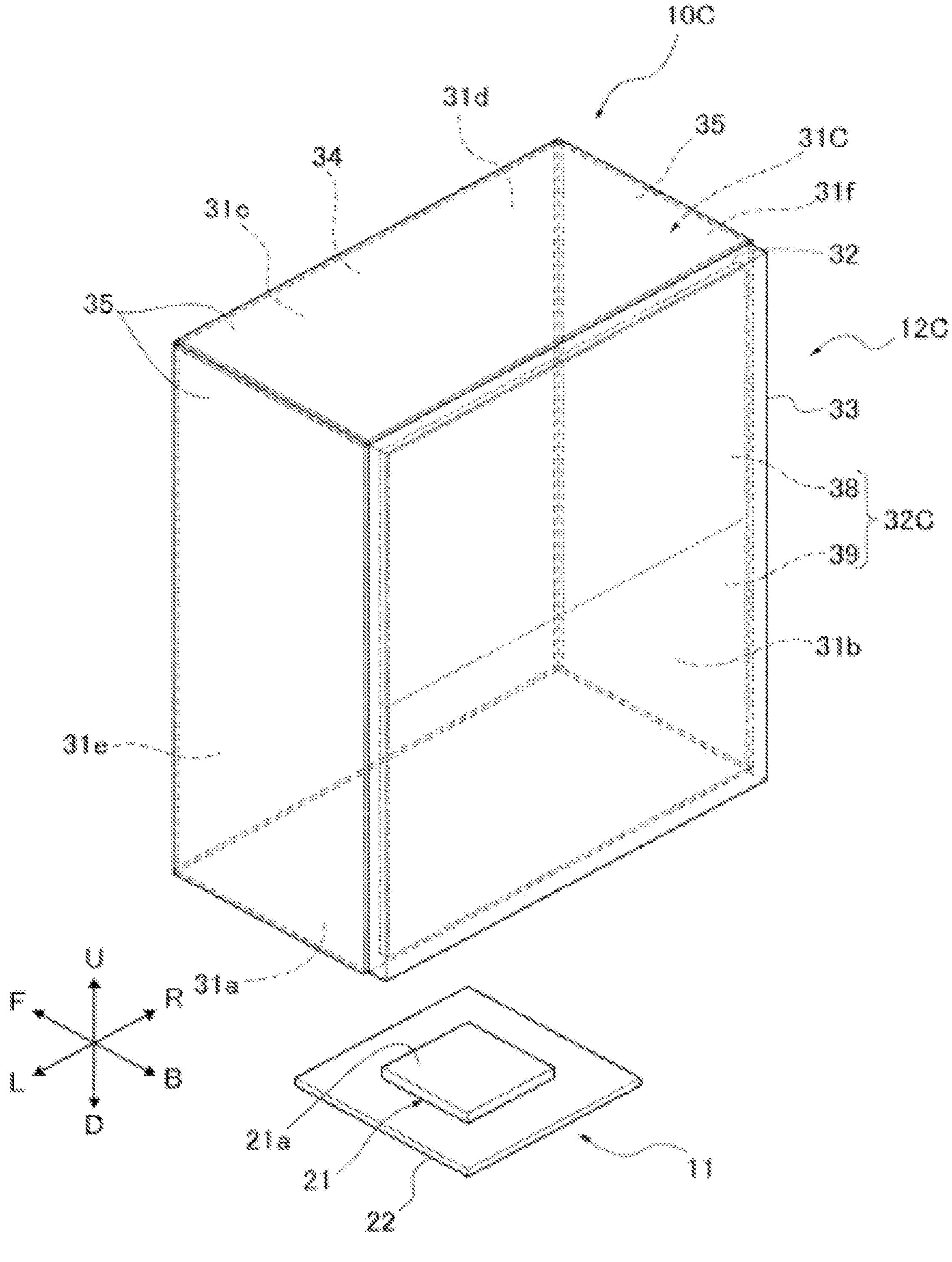
FIG. 5 is an explanatory diagram schematically illustrating a light source unit of a fourth embodiment in a similar manner to FIG. 2.

Now, a light source unit 10C of a fourth embodiment which is an embodiment of the present disclosure will be described with reference to FIG. 5. The light source unit 10C is one obtained by modifying the configuration of the support member 31 in the light generating part 12 of the light source unit 10 of the first embodiment. A basic concept and a configuration of the light source unit 10C are the same as those of the light source unit 10 of the first embodiment, and therefore the same reference numerals are affixed to parts having the same configurations, and detailed description will be omitted.

According to the light source unit 10C of the fourth embodiment, in a support member 31C of a light generating part 12C, a first light emitting layer 32C is sectioned into a first light emitting section 38 and a second light emitting section 39 aligned vertically. When the first light emitting section 38 and the second light emitting section 39 are irradiated with excitation light Le from a light source part 11 (light source 21 thereof), the first light emitting section 38 and the second light emitting section 39 each emit mutually different colored generated light Lg. The color of the generated light Lg to be emitted by each of the first light emitting section 38 and the second light emitting section 39 can be set by appropriately selecting a host material and a dopant material, as described in the first embodiment. Then, for example, a mask is provided on an area to form the second light emitting section 39 in a front surface 31*b* and the area is subject to deposition treatment, so that the thin film-like first light emitting section 38 is formed. Thereafter, a mask is provided on the first light emitting section 38 in the front surface 31*b*, and the first light emitting section 38 is subject to deposition treatment, so that the second light emitting section 39 is formed. In the first embodiment, the first light emitting section 38 emits generated light Lg of red light, and the second light emitting section 39 emits generated light Lg of yellow light. Thereafter, a sealing part 33 is provided as in the first embodiment, so that the first light emitting layer 32C having the first light emitting section 38 and the second light emitting section 39 can be sealed with the sealing part 33.

The first light emitting layer 32C has the first light emitting section 38 and the second light emitting section 39, and therefore this light source unit 10C can perform surface emission while the first light emitting section 38 and the second light emitting section 39 have the colors different from each other. Consequently, the light source unit 10C can combine a plurality of colors to perform surface emission while ensuring reliability.

The light source unit 10C of the fourth embodiment has basically the same configuration as the light source unit 10 of the first embodiment, and therefore the same effects as in the first embodiment can be obtained.

In addition to the above, in the light source unit 10C, the first light emitting layer 32C is sectioned into two or more light emitting sections (the first light emitting section 38 and the second light emitting section 39) each having emitting different colored generated light Lg in response to the excitation light Le. Therefore, the light source unit 10C can illuminate the first light emitting layer 32C as a plurality of different colored areas, and can combine a plurality of colors to perform surface emission while ensuring reliability.

Accordingly, the light source unit 10C of the fourth embodiment as a light source unit according to the present disclosure can appropriately perform surface emission.

In the fourth embodiment, the first light emitting layer 32C is vertically sectioned into two sections, namely, the first light emitting section 38 and the second light emitting section 39. However, as long as the first light emitting layer 32C is sectioned into two or more light emitting sections each having emitting different colored generated light Lg in response to the excitation light Le, the shape, the positional relationship, the color emitted, the number, and the like of each of the light emitting sections can be set appropriately, and are not limited to the configuration of the fourth embodiment. As an example of other shapes, for example, a first light emitting section 38 is provided in the center and a second light emitting section 39 is provided so as to surround the first light emitting section 38.

In the fourth embodiment, it is assumed that the first light emitting section 38 and the second light emitting section 39 in the first light emitting layer 32C perform light emission with respective different colors simultaneously by the excitation light Le from the light source part 11. However, the first light emitting section 38 and the second light emitting section 39 may be illuminated separately. In this case, for example, when the first light emitting section 38 and the second light emitting section 39 are vertically aligned as in the fourth embodiment, a light source part having the same configuration as that of the light source part 11 is provided on the upper side, and a light shielding member or a reflective member is provided inside the support member 31C in accordance with the separation between the first light emitting section 38 and the second light emitting section 39. Consequently, when the light source part 11 is turned on, only the second light emitting section 39 can be illuminated, and when the upper light source part is turned on, only the first light emitting section 38 can be illuminated, and the first light emitting section 38 illuminated in red can be used as a tail lamp and the second light emitting section 39 illuminated in yellow can be used as a turn lamp (signal light).

Fifth Embodiment

Figure 6:
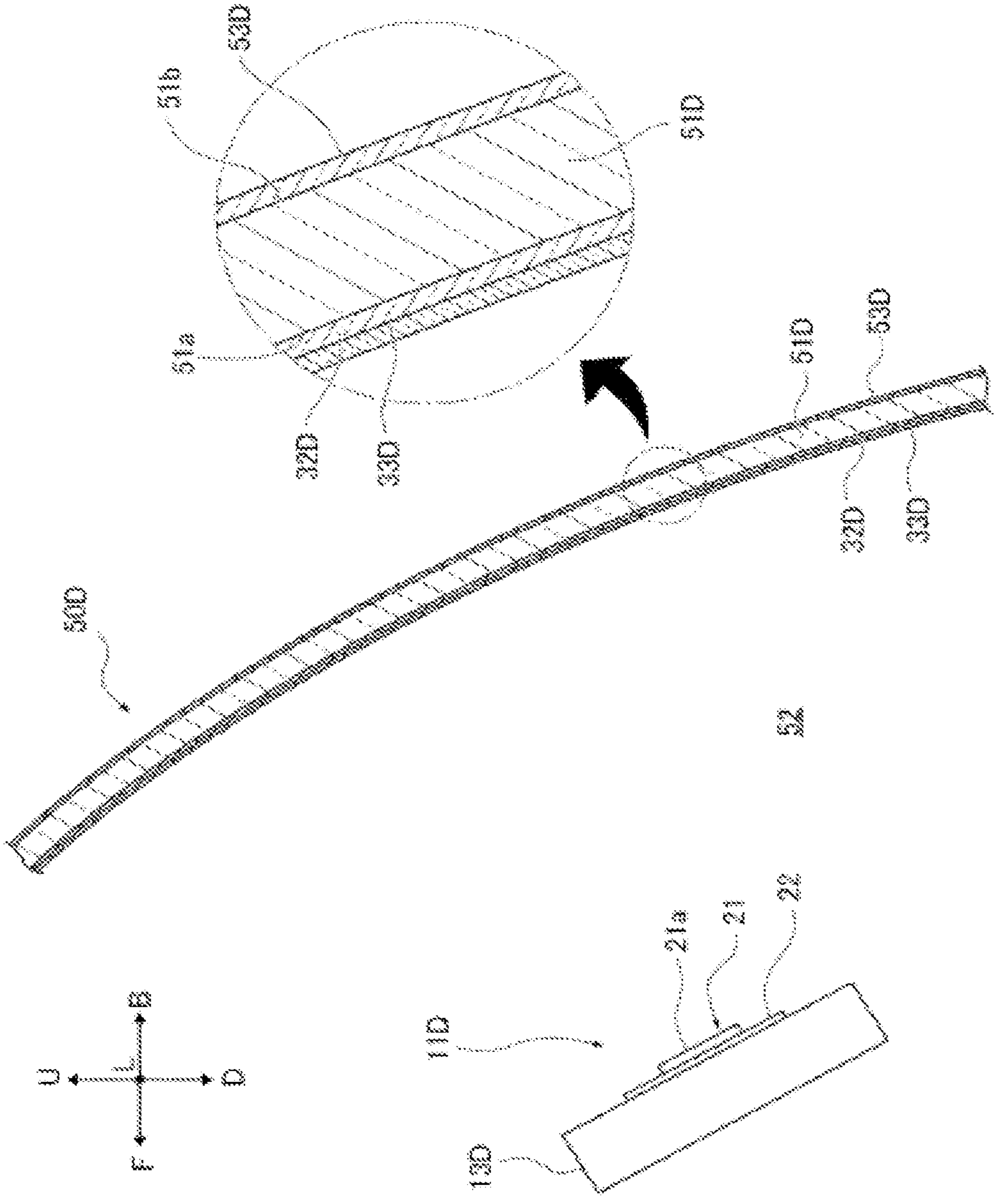
FIG. 6 is an explanatory diagram schematically illustrating a vehicular lamp of a fifth embodiment in a similar manner to FIG. 1.

Now, a vehicular lamp 50D of a fifth embodiment which is an embodiment of the present disclosure will be described with reference to FIG. 6. The vehicular lamp 50D is one obtained by changing the installation position in the lamp chamber 52 of the vehicular lamp 50 of the first embodiment, and is used as a tail lamp. A basic concept and a configuration of the vehicular lamp 50D are the same as those of the vehicular lamp 50 of the first embodiment, and therefore the same reference numerals are affixed to parts having the same configurations, and detailed description will be omitted.

Alight source part 11D emits excitation light Le, has a light source 21 and a support substrate 22, and is provided with the support substrate 22 on a heat radiating member 13D via a bracket or the like. The heat radiating member 13D is disposed such that a surface mounted with the support substrate 22 is directed toward an outer lens 51D.

The outer lens 51D thereof includes a light emitting layer 32D as a light emitting part that emits generated light Lg by being irradiated with excitation light Le, a sealing part 33D that seals the light emitting layer 32D, and a filter part 53D that inhibits the transmission of ultraviolet rays. The light emitting layer 32D is provided on an inner surface 51*a* of the outer lens 51D in the fifth embodiment. This light emitting layer 32D is formed in the form of a thin film by the inner surface 51*a* being subjected to deposition treatment in the same manner as the light emitting layer 32 of the first embodiment, and emits the generated light Lg of red light. The light emitting layer 32D is transparent in a state in which there is no irradiation with the excitation light Le.

The sealing part 33D is provided on an inner surface of the light emitting layer 32D (an inner surface that is on the lamp chamber 52 side). The sealing part 33D is formed of a material that transmits the excitation light Le and the generated light Lg. The sealing part 33D is provided on the inner side of the light emitting layer 32D so as to cover an entire surface of the light emitting layer 32D. Consequently, the sealing part 33D cooperates with the outer lens 51D to prevent the light emitting layer 32D from being exposed to air.

The filter part 53D is provided on an outer surface 51*b* of the outer lens 51D in the fifth embodiment. Similar to the filter part 53 of the first embodiment, this filter part 53D is formed in the form of a thin film by applying a coating having a function of UV cutting to the outer surface 51B, and is transparent.

In the vehicular lamp 50D of the fifth embodiment, electric power is supplied from a lighting control circuit to turn on the light source 21 of the light source part 11D, so that the excitation light Le emitted from the light emitting surface 21*a* of the light source 21 goes to the outer lens 51D. The entire surface of the light emitting layer 32D provided on the inner surface 51*a* of the outer lens 51D is irradiated with the excitation light Le. Then, the light emitting layer 32D is excited by being irradiated with the excitation light Le to emit the generated light Lg that is red light, and the generated light Lg travels to the outside of the lamp chamber 52 through the outer lens 51 and is emitted from the vehicular lamp 50D. This generated light Lg as the red light is emitted outward from the outer lens 51D, so that the light emitting layer 32D, namely, the outer lens 51D can be caused to perform surface emission. Therefore, the vehicular lamp 50D can perform surface emission while ensuring reliability, and can function as a tail lamp.

The vehicular lamp 50D is provided with the filter part 53D having a function of UV cutting on the outer lens 51D, and therefore can prevent, for example, ultraviolet rays included in external light from penetrating the outer lens 51 and traveling to the light emitting layer 32D, and can prevent the light emitting layer 32D from being degraded by the ultraviolet rays. Furthermore, the light emitting layer 32D is transparent in a state in which there is no irradiation with the excitation light Le, and the filter part 53D is transparent, and therefore the vehicular lamp 50D can have good appearance similar to a transparent tail lamp.

Herein, a part of the generated light Lg emitted by the light emitting layer 32D travels toward the inner side of the lamp chamber 52. Therefore, the vehicular lamp 50D may be provided with a reflective part similar to the first reflective part 34 of the first embodiment on an inner wall surface (a surface on the lamp chamber 52 side) of the lamp housing that constitutes the lamp chamber 52. When the vehicular lamp 50D has such a configuration, the generated light Lg emitted by the light emitting layer 32D can be efficiently used and it is possible to perform surface emission more brightly.

The vehicular lamp 50D of the fifth embodiment has basically the same configuration as the vehicular lamp 50 of the first embodiment, and therefore the same effects as in the first embodiment can be obtained.

In addition to the above, the vehicular lamp 50D can have a simpler configuration than the vehicular lamp 50 of the first embodiment since the light generating part 12 is eliminated by providing the light emitting layer 32D on the outer lens 51D.

Accordingly, the vehicular lamp 50D of the fifth embodiment as the light emitting device for a mobile body according to the present disclosure can appropriately perform surface emission.

Figure 7:
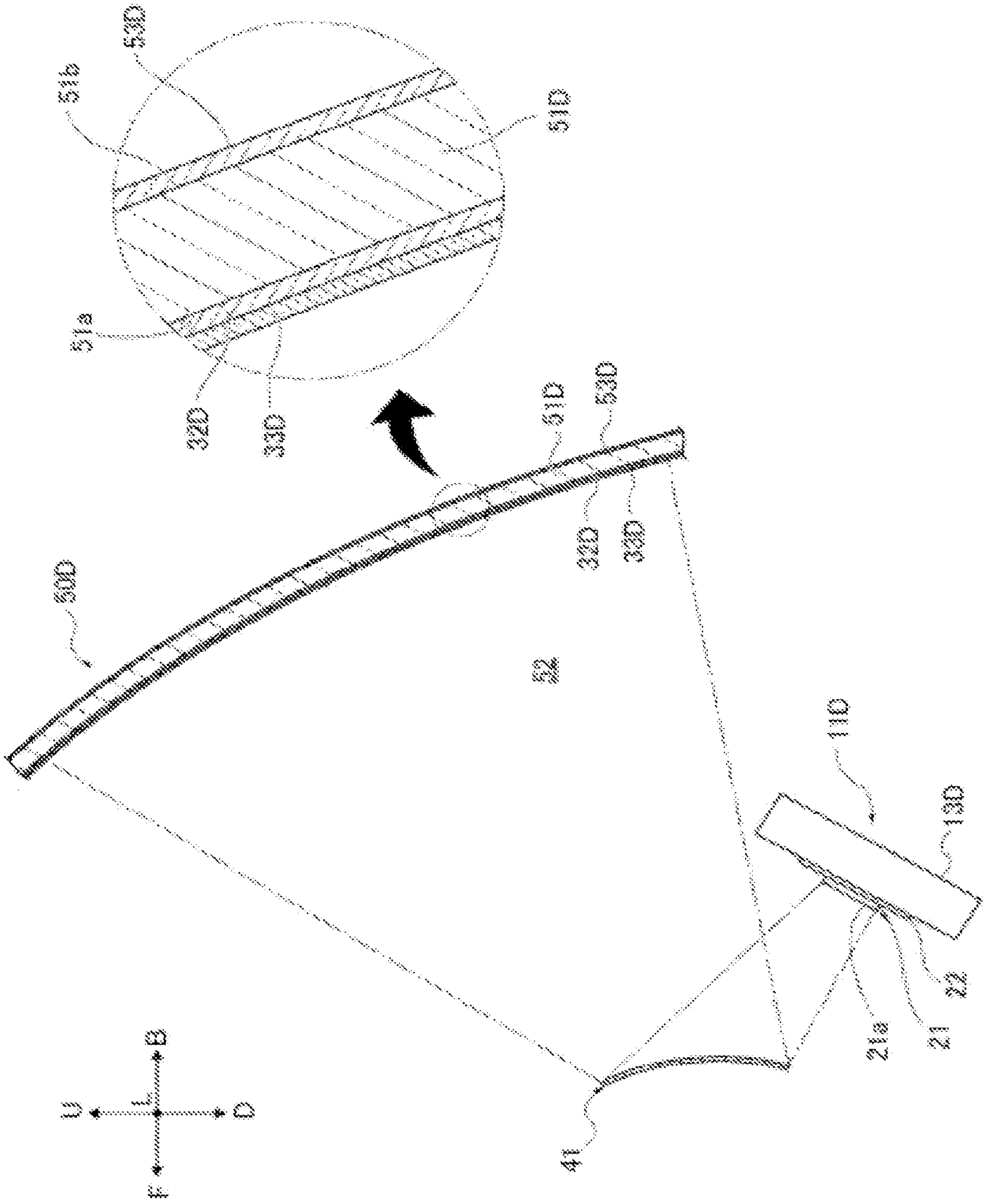
FIG. 7 is an explanatory diagram schematically illustrating a vehicular lamp as another example of a vehicular lamp of the fifth embodiment.

In the fifth embodiment, the excitation light Le from the light source part 11D (light source 21) travels to the outer lens 51D (light emitting layer 32D provided therein) directly. However, as illustrated in FIG. 7, the vehicular lamp 50D may be provided with a reflective part 41, and a light source part 11D may be provided such that a light emitting surface 21*a* of a light source 21 faces the reflective part 41. The vehicular lamp 50D of FIG. 7 with such a configuration can cause the outer lens 51D to perform surface emission while preventing the light source part 11D from being visually recognized from outside.

In the fifth embodiment, in the outer lens 51D, the light emitting layer 32D is provided on the inner surface 51*a* and the filter part 53D is provided on the outer surface 51*b*. However, as long as the filter part 53D and the light emitting layer 32D are provided in the outer lens 51D in this order from the outside (outside of the vehicular lamp 50D), the positional relationship with respect to the outer lens 51D can be set appropriately and is not limited to the configuration of the fifth embodiment.

Further, in the fifth embodiment, it is assumed that the single light source part 11D is used. However, the plurality of light source parts 11D may be disposed appropriately toward the outer lens 51D to make the entire outer lens 51D perform surface emission, and is not limited to the configuration of the fifth embodiment.

Further, in the fifth embodiment, the outer lens 51D is provided with the light emitting layer 32D, the sealing part 33D, and the filter part 53D to function as a tail lamp. However, an inner lens may be provided between the light source part 11D and the outer lens 51D, and the inner lens may be configured to have at least the light emitting layer 32D and the sealing part 33D. With such a configuration, the vehicular lamp can be used as a tail lamp in a rear combination lamp. At this time, a light source unit having the same configuration as such a configuration and provided with the light emitting layer 32D that performs yellow surface emission like the second light emitting section 39 of the third embodiment is provided, so that a tail lamp and a turn lamp in the rear combination lamp can be formed together.

Although the light source unit and the light emitting apparatus for a mobile body of the present disclosure are described above on the basis of each embodiment, the specific configuration is not limited to each embodiment, and design changes, additions, and the like are allowed without departing from the gist of the invention in each claim of the scope of the patent claims.

In each of the embodiments, it is assumed that the light emitting layer (32 or the like) has the shape described above and emits the generated light Lg of red light (and partly yellow light in the fourth and fifth embodiments). However, the shape of the light emitting layer and the color of the generated light Lg to be emitted may be set appropriately, and are not limited to the configuration of each embodiment. Consequently, the light source unit and the light emitting apparatus for a mobile body can be each made to function as, for example, a tail lamp or a signal lamp corresponding to a variety of designs.

In each of the first embodiment to the fourth embodiment, the light source part (11, etc.) is disposed below the light generating part (12, etc.). However, as long as the generated light Lg is emitted from the light emitting layer (32, 36, etc.) of the light generating part t by the excitation light Le from the light source part, the positional relationship between the light source part and the light generating part can be set appropriately and is not limited to the configuration of each embodiment.

Furthermore, in each of the first embodiment to the fourth embodiment, the sealing part 33 is provided so as to cover the light emitting layer (32, etc.) in the light generating part (12, etc.), and therefore the front surface 31*b* is positioned such that the sealing part 33 surrounds and frame the light emitting layer when viewed from the front. With this configuration, the sealing part 33 is transparent, and therefore the excitation light Le and the generated light Lg are emitted from the periphery of the light emitting layer, and the light emitting layer can be surrounded and illuminated, and gradation can be formed together with the light emitting layer. In contrast, at the position framed by the sealing part 33 on the front surface 31*b*, the same reflective part as the first reflective part 34 and the second reflective parts 35 is provided or a light-shielding member is provided, so that it is possible to perform surface emission in a single color.

In each of the first embodiment to the fourth embodiment, the support part (support member 31) of the light generating part (12, etc.) is a rectangle (hexahedron in the second embodiment). However, as long as the support part is provided with a light emitting part (light emitting layer 32) that emits generated light Lg by being irradiated with excitation light Le from the light source part 11, and a reflective part (first reflecting part 34) on the back surface 31*c* on the opposite side of the emission direction De to the generated light Lg, the shape may be set as appropriate and is not limited to the configuration of the first embodiment. The support part may be configured, for example, to be formed in a rectangular solid having a box shape with an open end by using glass or the like, to be provided with a light emitting part therein and to be provided with a reflective part (first reflective part 34) on the back surface 31*c* on the opposite side to the emission direction De of the generated light Lg. In this case, the light emitting part is accommodated in the box-shaped support part in a state in which the red phosphorescent material or the like described in the first embodiment is dissolved in a solvent such as dichloroethane and the open end is sealed with a plate-like member, so that the light emitting part can be provided inside the box-shaped support part.

In each of the first embodiment to the fourth embodiment, the second reflective parts 35 are provided on all of the upper surface 31*d*, the first side surface 31*e*, and the second side surface 31*f*, which are side surfaces connecting the front surface 31*b* and the back surface 31*c* at the different positions from the incident surface 31*a*, but may not be provided, or may be only partially provided, and is not limited to the configuration of the first embodiment.

Although each of the embodiments illustrates a vehicular lamp (50, etc.) used for an automobile as a light emitting device for a mobile body, a light emitting device for a mobile body used for a mobile body such as a train, a linear motor car, an airplane may be used, and the light emitting device for a mobile body is not limited to the configuration of each of the embodiments described above.

The respective configurations of the light source units 10, 10A, 10B, 10C and the vehicular lamps 50 and 50D are described in the embodiments, but each of the configurations may be combined with other configurations as appropriate, and the present disclosure is not limited to the configuration of each embodiment described above.

DESCRIPTION OF REFERENCE NUMERALS

10, 10A, 10B, 10C light source unit
11, 11D light source part
31, 31A, 31B, 31C support member (as an example of a support part)
31*a* incident surface
31*b* front surface
31*c* back surface
31*d*, 31*d*A upper surface (as an example of a side surface)
31*e*, 31*e*A first side surface (as an example of a side surface)
31*f*, 31*f*A second side surface (as an example of a side surface)
32, 32C, 32D (first) light emitting layer (as an example of a light emitting part)
34, 34B first reflective part
35 second reflective part
36 second light emitting layer (as an example of a second light emitting part)
38 first light emitting section (as an example of a light emitting section)
39 second light emitting section (as an example of a light emitting section)
50, 50D vehicular lamp (as an example of a light emitting device for a mobile body)
51, 51D outer lens
53, 53D filter part
De emission direction
Le excitation light
Lg generated light

The invention claimed is:

1. A vehicular lamp with a lamp chamber comprising:
a light source for emitting excitation light, the light source having a light emitting surface which emits a Lambertian distribution of said excitation light;
a convex reflective part;
a light emitting layer including organic material or inorganic material and for emitting generated light by being irradiated with the excitation light, and
a lens through which the generated light travels to the outside of the lamp chamber so that the generated light is emitted from the vehicular lamp, wherein:
the excitation light from the light source is dispersed by the convex reflective part and travels to the light emitting layer so that the light emitting layer emits the generated light and performs surface emission,
the light emitting layer is provided on an inner surface of the lens, and
the light emitting layer is excited by being irradiated with blue excitation light to emit red generated light and the vehicle lamp functions as a tail lamp.

2. A vehicular lamp of claim 1, further comprising:
a light source part including the light source, wherein:
the light source is provided such that a light emitting surface of the light source faces the convex reflective part, and
the light source part is prevented from being visually recognized from outside of the vehicle.

3. A vehicular lamp of claim 2, further comprising:
a support substrate on which the light source is mounted, and
a heat radiating member for radiating heat from the light source, wherein the support substrate is provided on the heat radiating member.

4. A vehicular lamp of claim 1, further comprising a sealing part formed of a material that transmits the excitation light and the generated light, wherein the sealing part is provided on the inner side of the light emitting layer so as to cover an entire surface of the light emitting layer and cooperates with the lens to prevent the light emitting layer from being exposed to air.

5. A vehicular lamp of claim 4, further comprising a filter part provided on an outer surface of the lens, wherein the filter part is formed in the form of thin film by applying a coating having a function of UV cutting to an outer surface of the lens and is transparent.

6. A vehicular lamp of claim 1, wherein the light emitting layer is transparent in a state in which there is no irradiation with the excitation light.

7. A vehicular lamp of claim 1, wherein the light emitting layer includes at least one material from a red phosphorescent material, a blue phosphorescent material, a yellow phosphorescent material, and a green phosphorescent material.

8. A vehicular lamp of claim 1, wherein the light emitting layer is formed in the form of a thin film including organic material.

9. A vehicular lamp with a lamp chamber comprising:
a light source for emitting excitation light, the light source having a light emitting surface which emits a Lambertian distribution of said excitation light;
a convex reflective part;
a light emitting layer including organic material or inorganic material and for emitting generated light by being irradiated with the excitation light, and
a lens through which the generated light travels to the outside of the lamp chamber so that the generated light is emitted from the vehicular lamp, wherein:
the excitation light from the light source is dispersed by the convex reflective part and travels to the light emitting layer so that the light emitting layer emits the generated light and performs surface emission, and
the light emitting layer is excited by being irradiated with blue excitation light to emit red generated light and the vehicle lamp functions as a tail lamp.

10. A vehicular lamp of claim 9, further comprising:
a light source part including the light source, wherein:
the light source is provided such that a light emitting surface of the light source faces the convex reflective part, and
the light source part is prevented from being visually recognized from outside of the vehicle.

11. A vehicular lamp of claim 10, further comprising:
a support substrate on which the light source is mounted, and
a heat radiating member for radiating heat from the light source, wherein the support substrate is provided on the heat radiating member.

12. A vehicular lamp of claim 9, wherein the light emitting layer is provided on an inner surface of the lens.

13. A vehicular lamp of claim 12, further comprising a sealing part formed of a material that transmits the excitation light and the generated light, wherein the sealing part is provided on the inner side of the light emitting layer so as to cover an entire surface of the light emitting layer and cooperates with the lens to prevent the light emitting layer from being exposed to air.

14. A vehicular lamp of claim 13, further comprising a filter part provided on an outer surface of the lens, wherein the filter part is formed in the form of thin film by applying a coating having a function of UV cutting to an outer surface of the lens and is transparent.

15. A vehicular lamp of claim 9, wherein the light emitting layer is transparent in a state in which there is no irradiation with the excitation light.

16. A vehicular lamp of claim 9, wherein the light emitting layer includes at least one material from a red phosphorescent material, a blue phosphorescent material, a yellow phosphorescent material, and a green phosphorescent material.

17. A vehicular lamp of claim 9, wherein the light emitting layer is formed in the form of a thin film including organic material.

18. A vehicular lamp with a lamp chamber comprising:
a light source for emitting excitation light, the light source having a light emitting surface which emits a Lambertian distribution of said excitation light;
a convex reflective part;
a light emitting layer including organic material or inorganic material and for emitting generated light by being irradiated with the excitation light, and
a lens through which the generated light travels to the outside of the lamp chamber so that the generated light is emitted from the vehicular lamp, wherein:
the wavelength of the excitation light is shorter than the wavelength of the generated light, and
the excitation light from the light source is dispersed by the convex reflective part and travels to the light emitting layer so that the light emitting layer emits the generated light and performs surface emission so that the vehicular lamp functions as a lamp.

19. A vehicular lamp of claim 18, further comprising:
a light source part including the light source, wherein:
the light source is provided such that a light emitting surface of the light source faces the convex reflective part and
the light source part is prevented from being visually recognized from outside of the vehicle.

20. A vehicular lamp of claim 19, further comprising:
a support substrate on which the light source is mounted, and
a heat radiating member for radiating heat from the light source, wherein the support substrate is provided on the heat radiating member.

21. A vehicular lamp of claim 18, wherein the light emitting layer is provided on an inner surface of the lens.

22. A vehicular lamp of claim 21, further comprising a sealing part formed of a material that transmits the excitation light and the generated light, wherein the sealing part is provided on the inner side of the light emitting layer so as to cover an entire surface of the light emitting layer and cooperates with the lens to prevent the light emitting layer from being exposed to air.

23. A vehicular lamp of claim 22, further comprising a filter part provided on an outer surface of the lens, wherein the filter part is formed in the form of thin film by applying a coating having a function of UV cutting to an outer surface of the lens and is transparent.

24. A vehicular lamp of claim 18, wherein the light emitting layer is transparent in a state in which there is no irradiation with the excitation light.

25. A vehicular lamp of claim 18, wherein the light emitting layer is excited by being irradiated with blue excitation light to emit red generated light and the vehicle lamp function as a tail lamp.

26. A vehicular lamp of claim 18, wherein the light emitting layer includes at least one material from a red phosphorescent material, a blue phosphorescent material, a yellow phosphorescent material, and a green phosphorescent material.

27. A vehicular lamp of claim 18, wherein the light emitting layer is formed in the form of a thin film including organic material.

28. A vehicular lamp with a lamp chamber comprising:

a light source for emitting excitation light, the light source having a light emitting surface which emits a Lambertian distribution of said excitation light:

a light emitting layer including organic material or inorganic material and for emitting generated light by being irradiated with the excitation light, a lens through which the generated light travels to the outside of the lamp chamber so that the generated light is emitted from the vehicular lamp, a convex reflective part, and a light source part including the light source, wherein:

the wavelength of the excitation light is shorter than the wavelength of the generated light, the light source is provided such that a light emitting surface of the light source faces the convex reflective part and the light source part is prevented from being visually recognized from outside of the vehicle, and the excitation light from the light source is dispersed by the convex reflective part and travels to the light emitting layer so that the light emitting layer emits the generated light and performs surface emission so that the vehicular lamp functions as a lamp.

29. A vehicular lamp of claim 28, further comprising:

a support substrate on which the light source is mounted, and a heat radiating member for radiating heat from the light source, wherein the support substrate is provided on the heat radiating member.

30. A vehicular lamp of claim 28, wherein the light emitting layer is provided on an inner surface of the lens.

31. A vehicular lamp of claim 30, further comprising a sealing part formed of a material that transmits the excitation light and the generated light, wherein the sealing part is provided on the inner side of the light emitting layer so as to cover an entire surface of the light emitting layer and cooperates with the lens to prevent the light emitting layer from being exposed to air.

32. A vehicular lamp of claim 31, further comprising a filter part provided on an outer surface of the lens, wherein the filter part is formed in the form of thin film by applying a coating having a function of UV cutting to an outer surface of the lens and is transparent.

33. A vehicular lamp of claim 28, wherein the light emitting layer is transparent in a state in which there is no irradiation with the excitation light.

34. A vehicular lamp of claim 28, wherein the light emitting layer including at least one material from a red phosphorescent material, a blue phosphorescent material, a yellow phosphorescent material, and a green phosphorescent material.

35. A vehicular lamp of claim 28, wherein the light emitting layer is formed in the form of a thin film including organic material.

36. A vehicular lamp of claim 28, wherein the light emitting layer is excited by being irradiated with blue excitation light to emit red generated light and the vehicle lamp function as a tail lamp.

* * * * *